United States Patent
Oba (10) Patent No.: US 9,638,910 B2
(45) Date of Patent: May 2, 2017

(54) IMAGE MEASUREMENT DEVICE

(71) Applicant: Keyence Corporation, Osaka (JP)

(72) Inventor: Hayato Oba, Osaka (JP)

(73) Assignee: Keyence Corporation, Osaka (JP)

( * ) Notice: Subject to any disclaimer, the term of this patent is extended or adjusted under 35 U.S.C. 154(b) by 225 days.

(21) Appl. No.: 14/600,023

(22) Filed: Jan. 20, 2015

(65) Prior Publication Data

US 2015/0241683 A1    Aug. 27, 2015

(30) Foreign Application Priority Data

Feb. 27, 2014  (JP) ................................. 2014-037539

(51) Int. Cl.

| | |
|---|---|
| G02B 21/06 | (2006.01) |
| G01B 11/24 | (2006.01) |
| G02B 21/36 | (2006.01) |
| G02B 21/00 | (2006.01) |
| G01B 11/02 | (2006.01) |

(52) U.S. Cl.
CPC ............ *G02B 21/06* (2013.01); *G01B 11/022* (2013.01); *G01B 11/028* (2013.01); *G01B 11/24* (2013.01); *G02B 21/0016* (2013.01); *G02B 21/367* (2013.01)

(58) Field of Classification Search
CPC .. G02B 21/06; G02B 21/0016; G02B 21/367; G01B 11/022; G01B 11/028; G01B 11/24
See application file for complete search history.

(56) References Cited

U.S. PATENT DOCUMENTS 5,319,462 A * 6/1994 Haruki ............... H04N 5/23212
                                                                348/347
5,901,236 A * 5/1999 Mizui .................... G01C 15/00
                                                                382/103

(Continued)

FOREIGN PATENT DOCUMENTS

JP         2010127886 A  *  6/2010
JP         2012-032224       2/2012

(Continued)

*Primary Examiner* — Jay Patel
*Assistant Examiner* — Joseph Suh
(74) *Attorney, Agent, or Firm* — Kilyk & Bowersox, P.L.L.C.

(57) ABSTRACT

The image measurement device includes: a measurement target place specifying part that specifies a measurement target place on a workpiece image based on a user's operation; an illumination condition storage part that holds two or more illumination conditions; an imaging control part that controls a camera and an illumination device to acquire two or more of the workpiece images sequentially photographed while making the illumination condition different; a workpiece image display part that displays the acquired plurality of workpiece images; a workpiece image selecting part that selects any one of the displayed workpiece images; an illumination condition deciding part that decides the illumination condition based on the selected workpiece image; and a dimension calculating part that extracts an edge of the measurement target place based on the workpiece image photographed on the decided illumination condition, and obtains a dimension of the measurement target place based on the extracted edge.

12 Claims, 9 Drawing Sheets

(56) References Cited

U.S. PATENT DOCUMENTS

| | | | | |
|---|---|---|---|---|
| 6,524,178 B1* | 2/2003 | Fassler | A22C 11/0245 | 452/37 |
| 6,677,987 B1* | 1/2004 | Girod | G06F 3/0386 | 348/171 |
| 9,151,600 B2* | 10/2015 | Nakatsukasa | G01B 11/25 | |
| 9,207,186 B2* | 12/2015 | Schulz | G01N 21/896 | |
| 2004/0246367 A1* | 12/2004 | Yoshida | G01B 11/02 | 348/370 |
| 2005/0131776 A1* | 6/2005 | Perotti | G06Q 30/0643 | 705/27.2 |
| 2006/0118742 A1* | 6/2006 | Levenson | A61B 5/0059 | 250/559.3 |
| 2006/0187337 A1* | 8/2006 | Ichikawa | G01D 5/347 | 348/370 |
| 2006/0279726 A1* | 12/2006 | Galambos | G06K 9/00221 | 356/71 |
| 2006/0280331 A1* | 12/2006 | Chosson | G07D 7/0013 | 382/100 |
| 2007/0285553 A1* | 12/2007 | Morita | H04N 5/2254 | 348/335 |
| 2008/0219515 A1* | 9/2008 | Namgoong | G06K 9/0061 | 382/117 |
| 2008/0267450 A1* | 10/2008 | Sugimoto | A63H 17/395 | 382/103 |
| 2010/0172598 A1* | 7/2010 | Kimura | G06T 5/006 | 382/296 |
| 2010/0183207 A1* | 7/2010 | Sakaguchi | A61B 6/507 | 382/128 |
| 2010/0302364 A1* | 12/2010 | Kim | G01B 11/2531 | 348/136 |
| 2011/0001974 A1* | 1/2011 | Harada | G03F 1/14 | 356/401 |
| 2011/0176731 A1* | 7/2011 | Fukushi | G06T 7/0026 | 382/170 |
| 2011/0249888 A1* | 10/2011 | Caceres | G11B 15/605 | 382/154 |
| 2012/0002198 A1* | 1/2012 | Jhung | G01J 3/02 | 356/305 |
| 2012/0027289 A1* | 2/2012 | Naruse | G06T 7/001 | 382/152 |
| 2012/0068629 A1* | 3/2012 | Matsuda | H05B 33/0803 | 315/313 |
| 2012/0073120 A1* | 3/2012 | Shimazawa | G11B 5/105 | 29/603.07 |
| 2012/0185221 A1* | 7/2012 | Mori | H05K 13/08 | 703/2 |
| 2013/0016140 A1* | 1/2013 | Oniki | G09G 3/342 | 345/690 |
| 2013/0021461 A1* | 1/2013 | Zahniser | G01N 1/31 | 348/77 |
| 2013/0095849 A1* | 4/2013 | Pakzad | H04W 64/00 | 455/456.1 |
| 2013/0314731 A1* | 11/2013 | Omi | H04N 1/00347 | 358/1.13 |
| 2013/0321602 A1* | 12/2013 | Hayama | A61B 1/00009 | 348/68 |
| 2014/0132962 A1* | 5/2014 | Petschik | G01D 5/285 | 356/492 |
| 2014/0152794 A1* | 6/2014 | Takahashi | G01B 11/24 | 348/79 |
| 2014/0233027 A1* | 8/2014 | Sutin | G01J 3/024 | 356/303 |
| 2014/0249790 A1* | 9/2014 | Spilker | G06F 19/3437 | 703/11 |
| 2015/0111217 A1* | 4/2015 | Hendriks | G01N 33/57484 | 435/6.19 |
| 2015/0130373 A1* | 5/2015 | Van De Sluis | G08C 17/02 | 315/308 |
| 2015/0142171 A1* | 5/2015 | Li | B25J 9/1692 | 700/251 |
| 2015/0237737 A1* | 8/2015 | Arai | H05K 3/022 | 361/784 |
| 2015/0301781 A1* | 10/2015 | Ekkaia | G06F 3/1446 | 362/237 |
| 2015/0324997 A1* | 11/2015 | Murakami | G06T 7/0097 | 348/207.1 |
| 2016/0004926 A1* | 1/2016 | Kerner | G01B 11/24 | 348/46 |

FOREIGN PATENT DOCUMENTS

| | | |
|---|---|---|
| JP | 2012-032341 | 2/2012 |
| JP | 2012-032344 | 2/2012 |
| JP | 2012-159409 | 8/2012 |
| JP | 2012-159410 | 8/2012 |

* cited by examiner

IMAGE MEASUREMENT DEVICE

CROSS-REFERENCE TO RELATED APPLICATIONS

The present application claims foreign priority based on Japanese Patent Application No. 2014-037539, filed Feb. 27, 2014, the contents of which is incorporated herein by reference.

BACKGROUND OF THE INVENTION

1. Field of the Invention

The present invention relates to an image measurement device, and more specifically to improvement in an image measurement device that extracts an edge in a workpiece image obtained by photographing a workpiece, to measure a dimension of the workpiece.

2. Description of Related Art

An image measurement device is a device that photographs a workpiece to acquire a workpiece image and extracts an edge in the workpiece image to measure a dimension and a shape of the workpiece (e.g., JP 2012-32224 A, JP 2012-32341 A, JP 2012-32344 A, JP 2012-159409 A, and JP 2012-159410 A). Normally, the workpiece is placed on a movable stage that is movable in X-, Y-, and Z-axis directions. By moving the movable stage in the Z-axis direction, the workpiece image is brought into focus, and by moving the movable stage in the X- or Y-axis direction, a position of the workpiece is adjusted into a field of view.

Since the workpiece image is an extremely accurate analog of the workpiece irrespective of a position of the movable stage in the Z-axis direction, determination of a distance and an angle on the workpiece image allows detection of an actual dimension on the workpiece. Edge extraction is performed by analyzing a change in luminance of the workpiece image, detecting edge points, and fitting a geometric figure such as a straight line, a circle, or an arc to the detected plurality of edge points, whereby an edge showing a boundary between the workpiece and a background, and roughness on the workpiece is obtained. The dimension of the workpiece is measured as a distance or an angle between the edges obtained in such a manner, or a central position or a diameter of a circular edge. Further, a difference (error) between the measured dimension value and a design value is compared as a tolerance, to perform quality determination.

In the case of measuring an outer shape of the workpiece by use of such an image measurement device, there is often used transmittance illumination for irradiating the workpiece on the stage with illumination light from the opposite side to a camera. In contrast, in the case of measuring a non-through hole, a step, and roughness on the workpiece, there is often used epi-illumination for irradiating the workpiece on the stage with illumination light from the same side as the camera.

In the conventional image measurement device, a texture on the workpiece surface, namely, a processing mark, a pattern, or fine roughness, may be erroneously extracted as an edge in dimension measurement using the epi-illumination, and the dimension measurement is thus difficult to stabilize as compared to the case of using the transmittance illumination, which has been problematic. Therefore, in accordance with a shape and a material of the workpiece, a variety of illumination devices have been separately used or an irradiation position with illumination light has been adjusted.

However, the selection of the type of illumination and the adjustment of the irradiation position require a wealth of knowledge based on expertise and experience, and in the dimension measurement using the epi-illumination, only a skilled person could fully exert performance of the device, which has been problematic. In particular, even with the same workpiece, when a position of a measurement target place varies, an appropriate type of illumination and an appropriate irradiation position also change, and thus only the skilled person could appropriately set the type of illumination and the irradiation position in accordance with the measurement target place, which has been problematic.

SUMMARY OF THE INVENTION

The present invention has been made in view of the above circumstances, and an object thereof is to provide an image measurement device whose performance can be fully exerted even by a non-skilled person. Especially, an object thereof is to provide an image measurement device capable of automatically adjusting an illumination condition such as a type of an illumination device or an irradiation position with illumination light in accordance with a measurement target place.

An image measurement device according to one embodiment of the invention includes: a stage for placing a workpiece; an illumination device that illuminates the workpiece on the stage; a camera that photographs the workpiece on the stage to generate a workpiece image; a measurement target place specifying unit that specifies a measurement target place on the workpiece image based on a user's operation; an illumination condition storage unit that holds two or more illumination conditions; an imaging control unit that controls the camera and the illumination device to acquire two or more of the workpiece images sequentially photographed while making the illumination condition different; a workpiece image display unit that displays the acquired plurality of workpiece images; a workpiece image selecting unit that selects any one of the displayed workpiece images; an illumination condition deciding unit that decides the illumination condition based on the selected workpiece image; and a dimension calculating unit that extracts an edge of the measurement target place based on the workpiece image photographed on the decided illumination condition, and obtains a dimension of the measurement target place based on the extracted edge.

In this image measurement device, when the measurement target place is specified, two or more workpiece images, sequentially photographed while making the illumination condition different, are acquired and displayed. When any one of the displayed workpiece images is then selected, an illumination condition is decided based on the selected workpiece image, and thus, even a non-skilled person can fully exert performance of the device. Especially, only by selecting the displayed workpiece image, an illumination condition such as a type of an illumination device or an irradiation position with illumination light can be automatically adjusted in accordance with a measurement target place.

In addition to the above configuration, an image measurement device according to another embodiment of the invention includes a measurement setting storage unit that holds, as measurement setting information, two or more measurement target places specified on the same workpiece image by the measurement target place specifying unit and an illumination condition decided by the illumination condition deciding unit with respect to each of these measurement target places, wherein the illumination condition is held in association with the measurement target place in the measurement setting storage unit, the imaging control unit repeatedly acquires a workpiece image photographed on the illumination condition held as the measurement setting information while changing the measurement target place, in successive measurement where the measurement setting information has been specified, and the dimension calculating unit performs edge extraction with respect to each of the measurement target places held as the measurement setting information on the plurality of workpiece images acquired in the successive measurement.

With such a configuration, since the illumination condition is held in association with the measurement target place in the measurement setting storage unit, an illumination condition suitable for measuring the measurement target place can be identified by specifying the measurement setting information. Further, in the successive measurement where the measurement setting information has been specified, the workpiece is photographed on an illumination condition suitable for measuring the measurement target place, and edge extraction is performed on the obtained workpiece image. Accordingly, even when a shape or a material of the workpiece changes, stable dimension measurement can be performed only by specifying the measurement setting information.

In addition to the above configuration, an image measurement device according to still another embodiment of the invention is configured such that the dimension calculating unit obtains a dimension between edges respectively extracted from two or more workpiece images with mutually different illumination conditions and positions of the measurement target place. With such a configuration, since a dimension between edges is obtained by using two or more workpiece images each photographed on an illumination condition suitable for measuring the measurement target place, it is possible to accurately identify a dimension between edges.

In addition to the above configuration, an image measurement device according to still another embodiment of the invention includes, as the illumination device, a diffused illumination device that irradiates the workpiece on the stage with diffused light from above; and a transmittance illumination device that irradiates the workpiece on the stage with illumination light from below, wherein the illumination conditions include a type of the illumination device.

With such a configuration, it is possible to separately use the diffused illumination device and the transmittance illumination device in accordance with the shape and the material of the workpiece. Further, only by selecting the displayed workpiece image, a type of the illumination device which is suitable for measuring the measurement target place can be selected.

In addition to the above configuration, an image measurement device according to still another embodiment of the invention includes, as the illumination device, a side-emitting illumination device that irradiates the workpiece on the stage from a side with illumination light as parallel light or with illumination light having a spread angle close to the parallel light. With such a configuration, it is possible to separately use the diffused illumination device, the transmittance illumination device and the side-emitting illumination device in accordance with the shape and the material of the workpiece.

In addition to the above configuration, an image measurement device according to still another embodiment of the invention includes, as the illumination device, a ring illumination device having a ring-shaped light source that surrounds a photographing axis of the camera, the light source being lit in units of two or more blocks, which are obtained by dividing in a circumferential direction, wherein the illumination conditions include a lighting position of the ring illumination device.

With such a configuration, it is possible to adjust the lighting position of the ring illumination device in accordance with the shape and the material of the workpiece. Further, only by selecting the displayed workpiece image, a lighting position of the ring illumination device which is suitable for measuring the measurement target place can be selected.

In addition to the above configuration, an image measurement device according to still another embodiment of the invention includes a relative position adjusting unit that moves the stage or the illumination device in the photographing axis direction of the camera, to adjust a relative position of the illumination device to the stage, wherein the illumination conditions include the relative position.

With such a configuration, it is possible to adjust the relative position of the illumination device to the stage in accordance with the shape and the material of the workpiece. Further, only by selecting the displayed workpiece image, a relative position of the illumination device which is suitable for measuring the measurement target place can be selected.

In addition to the above configuration, an image measurement device according to still another embodiment of the invention is configured such that the measurement target place specifying unit specifies, as the measurement target place, a region on the workpiece image photographed by irradiation with the diffused light of the diffused illumination device. With such a configuration, by use of the workpiece image photographed by irradiation with the diffused light, it is possible to specify the measurement target place while checking the whole image of the workpiece.

In addition to the above configuration, an image measurement device according to still another embodiment of the invention includes an illumination condition specifying unit that specifies the illumination condition based on the user's operation. With such a configuration, it is possible to arbitrarily specify an illumination condition in accordance with the shape or the material of the workpiece or the position of the measurement target place.

In addition to the above configuration, an image measurement device according to still another embodiment of the invention is configured such that the workpiece image selecting unit selects any one of the displayed workpiece images based on a change in luminance in the measurement target place. With such a configuration, it is possible to automatically select a workpiece image suitable for measuring the measurement target place out of two or more workpiece images sequentially photographed while making the illumination condition different, so as to decide an illumination condition.

In addition to the above configuration, an image measurement device according to still another embodiment of the invention is configured such that the dimension calculating unit extracts an edge of the measurement target place with respect to the acquired plurality of workpiece images, the workpiece image display unit displays the extracted edge on the corresponding workpiece image while listing and displaying the acquired plurality of workpiece images, and the workpiece image selecting unit selects a workpiece image specified by the user out of the listed and displayed workpiece images.

With such a configuration, the listed and displayed workpiece images are compared, and by means of the edge displayed on the workpiece image, it is possible to arbitrarily select a workpiece image on an illumination condition suitable for measuring the measurement target place.

In addition to the above configuration, an image measurement device according to still another embodiment of the invention is configured such that the dimension calculating unit obtains a dimension of the measurement target place based on the edge extracted from the measurement target place with respect to the acquired plurality of workpiece images, and the workpiece image display unit displays the obtained dimension on the corresponding workpiece image.

With such a configuration, the listed and displayed workpiece images are compared, and by means of the edge or the dimension displayed on the workpiece image, it is possible to arbitrarily select a workpiece image on an illumination condition suitable for measuring the measurement target place.

In addition to the above configuration, an image measurement device according to still another embodiment of the invention is configured such that, when two or more edges are extracted from the workpiece image photographed on the same illumination condition, the workpiece image display unit displays these edges on the corresponding workpiece image, and the image measurement device further includes an edge selecting unit which selects any one of the plurality of edges displayed on the workpiece image based on the user's operation. With such a configuration, by means of the plurality of edges displayed on the workpiece image, it is possible to select a workpiece image on an illumination condition suitable for measuring the measurement target place, and an appropriate edge.

In addition to the above configuration, an image measurement device according to still another embodiment of the invention includes an edge extraction parameter adjusting unit that adjusts an edge extraction parameter for edge extraction based on an edge specified by the user out of the plurality of edges extracted from the workpiece image photographed on the same illumination condition. With such a configuration, since the edge extraction parameter is automatically adjusted to a value suitable for extracting a desired edge from the measurement target place, it is possible to improve the stability of the edge extraction.

According to the present invention, it is possible to provide an image measurement device whose performance can be fully exerted even by a non-skilled person. Especially, it is possible to provide an image measurement device capable of automatically adjusting an illumination condition such as a type of an illumination device or an irradiation position with illumination light in accordance with a measurement target place only by selecting a displayed workpiece image. Further, it is possible to provide an image measurement device capable of suppressing erroneous extraction of a texture on the workpiece surface as an edge in dimension measurement using epi-illumination.

DETAILED DESCRIPTION OF PREFERRED EMBODIMENT

<Image Measurement Device 1>

Figure 1:
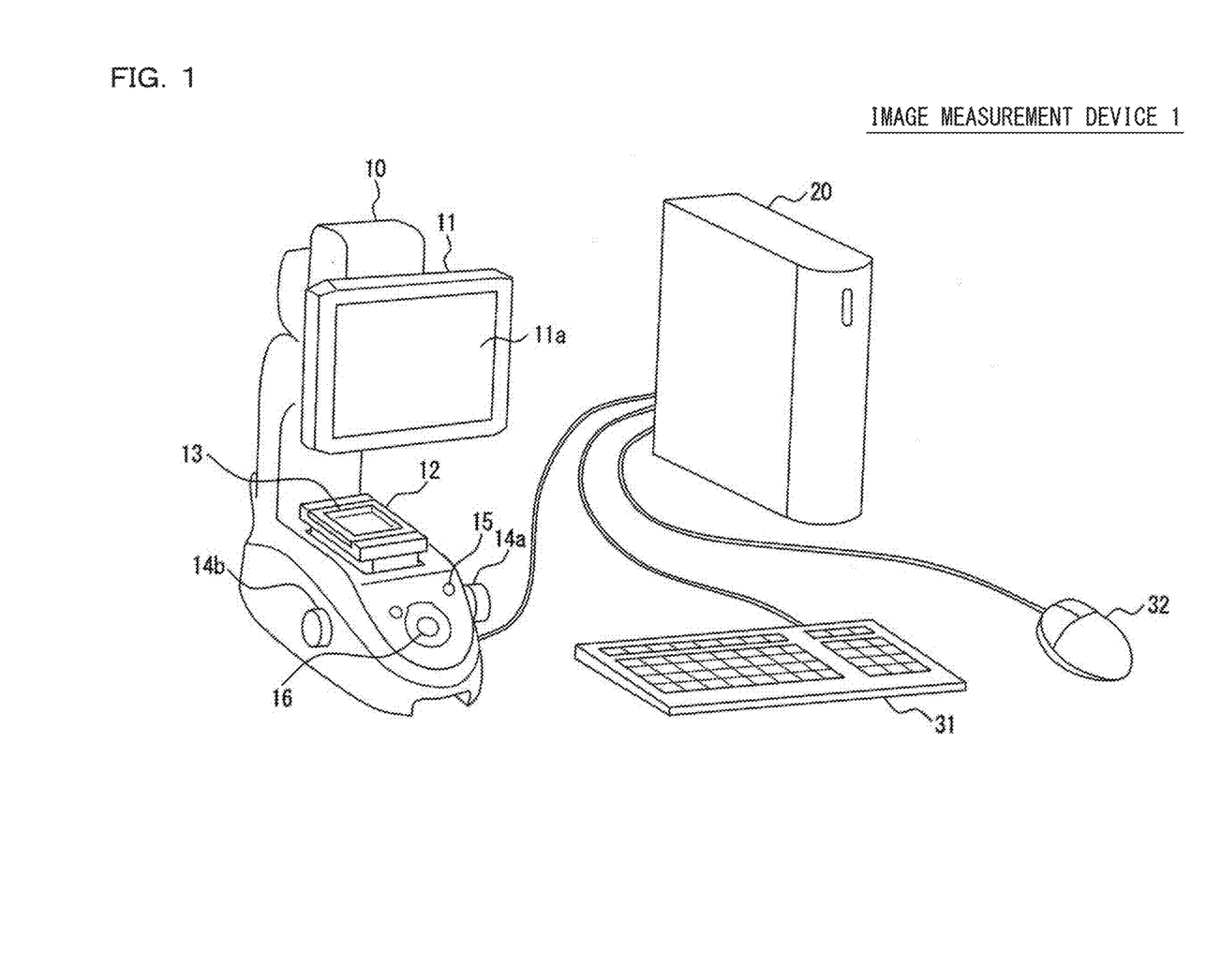
FIG. 1 is a perspective view showing one configuration example of an image measurement device 1 according to an embodiment of the present invention.

FIG. 1 is a perspective view showing one configuration example of an image measurement device 1 according to an embodiment of the present invention. This image measurement device 1 is a dimension measurement device that extracts an edge in a workpiece image obtained by photographing a workpiece to measure a dimension of the workpiece. The image measurement device 1 is configured by a measurement unit 10, a control unit 20, a keyboard 31, and a mouse 32. The workpiece is a measurement target whose shape and dimension are to be measured.

The measurement unit 10 includes a display device 11, a movable stage 12, an XY adjustment knob 14a, a Z adjustment knob 14b, a power switch 15, and an execute button 16. The measurement unit 10 irradiates the workpiece on the movable stage 12 with detection light being visible light and receives its transmitted light or reflected light to generate a workpiece image. The workpiece is placed in a detection area 13 of the movable stage 12. Further, the measurement unit 10 displays the workpiece image on a display screen 11a of the display device 11.

The display device 11 is a display device that displays a workpiece image or a measurement result on the display screen 11a. The movable stage 12 is a placement stage for placing the workpiece, and is provided with the detection area 13 where detection light is transmitted. The detection area 13 is a circular region made of transparent glass. This movable stage 12 can be moved in a Z-axis direction which is parallel to a photographing axis of a camera and in an X-axis direction and a Y-axis direction which is vertical to the photographing axis.

The XY adjustment knob 14a is an operation part for moving the movable stage 12 in the X-axis direction or the Y-axis direction to adjust the position in the X-axis direction and the Y-axis direction. The Z adjustment knob 14b is an operation part for moving the movable stage 12 in the Z-axis direction to adjust the position in the Z-axis direction. The power switch 15 is an operation part for switching a main power of each of the measurement unit 10 and the control unit 20 between an on-state and an off-state. The execute button 16 is an operation part for starting dimension measurement.

The control unit 20 is a controller part that controls photographing and screen display by the measurement unit 10 and analyzes a workpiece image to measure a dimension of the workpiece. The control unit 20 is connected with the keyboard 31 and the mouse 32. After turning-on of the power source, when the workpiece is arranged in the detection area 13 and the execute button 16 is operated, the dimension of the workpiece is automatically measured.

<Measurement Unit 10>

Figure 2:
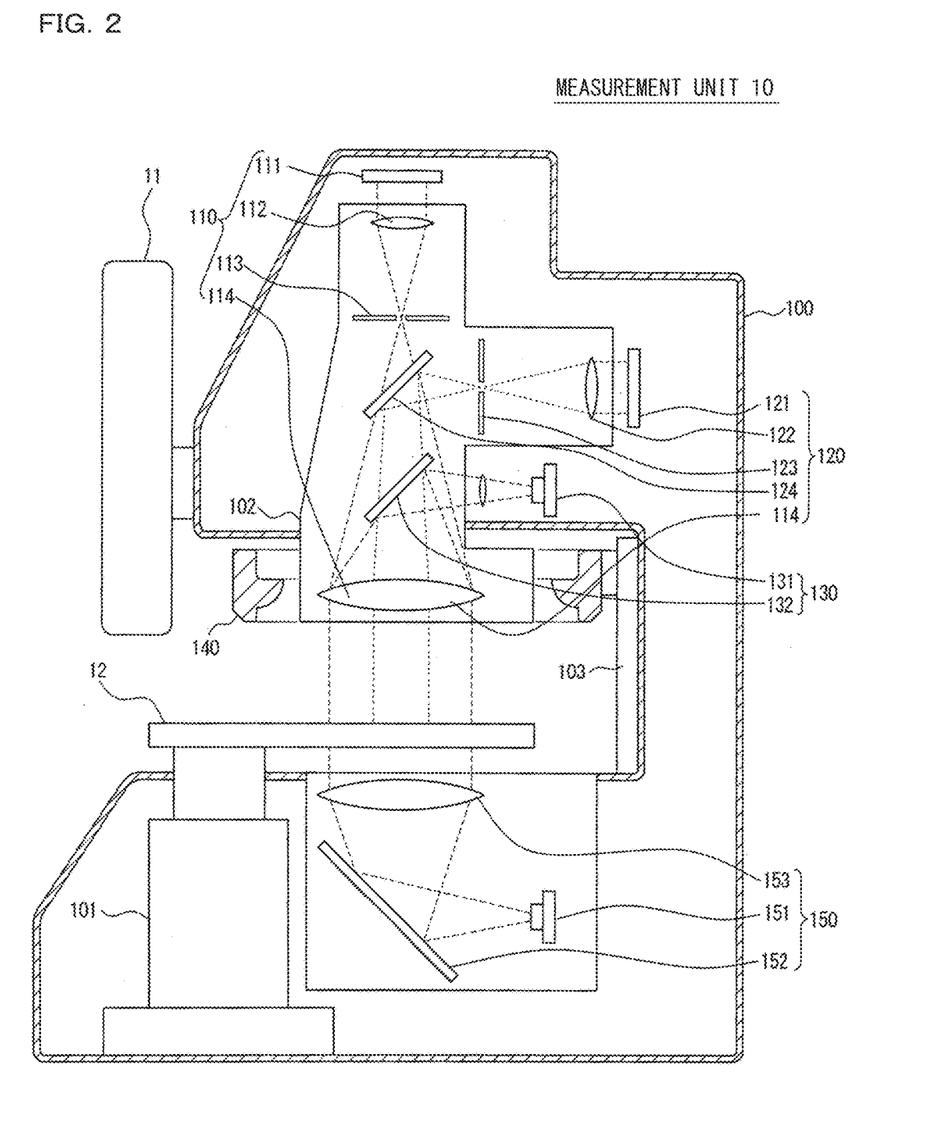
FIG. 2 is an explanatory view schematically showing a configuration example of a measurement unit 10 of FIG. 1, and shows a sectional plane in the case of cutting the measurement unit 10 by a vertical plane parallel to a photographing axis.

FIG. 2 is an explanatory view schematically showing a configuration example of the measurement unit 10 of FIG. 1, and shows a sectional plane in the case of cutting the measurement unit 10 by a vertical plane parallel to the photographing axis. This measurement unit 10 is configured by the display device 11, the movable stage 12, a casing 100, a stage adjusting part 101, a lens-barrel part 102, an illumination position adjusting part 103, cameras 110, 120, a coaxial epi-illumination unit 130, a ring illumination unit 140, and a transmittance illumination unit 150.

The stage adjusting part 101, the lens-barrel part 102, the cameras 110, 120, the coaxial epi-illumination unit 130 and the transmittance illumination unit 150 are arranged in the casing 100. The stage adjusting part 101 moves the movable stage 12 in the X-, Y-, or Z-axis direction based on a driving signal from the control unit 20, and adjusts the position of the workpiece in the X-, Y-, and Z-axis directions.

The camera 110 is an imaging device with a low photographing magnification, and is configured by an imaging element 111, an image forming lens 112, a diaphragm plate 113, and a light receiving lens 114. The imaging element 111 receives detection light and generates a workpiece image. This imaging element 111 is arranged with its light receiving surface facing downward. The image forming lens 112 is an optical member that forms an image with the detection light on the imaging element 111. The diaphragm plate 113 is an optical diaphragm that limits a transmitted light amount of the detection light, and is arranged between the image forming lens 112 and the light receiving lens 114. The light receiving lens 114 is an optical member that collects the detection light from the workpiece, and is arranged opposed to the movable stage 12. The image forming lens 112, the diaphragm plate 113, and the light receiving lens 114 are arranged with a vertically extending central axis taken as the center.

The camera 120 is an imaging device with a high photographing magnification, and is configured by an imaging element 121, an image forming lens 122, a diaphragm plate 123, a half mirror 124, and a light receiving lens 114. The imaging element 121 receives detection light and generates a workpiece image. This imaging element 121 is arranged with its light receiving surface facing toward a horizontal direction. The image forming lens 122 is an optical member that forms an image with the detection light on the imaging element 121. The diaphragm plate 123 is an optical diaphragm that limits a transmitted light amount of the detection light, and is arranged between the image forming lens 122 and the half mirror 124. The light receiving lens 114 is shared with the camera 110. The detection light transmitted through the light receiving lens 114 is bent in the horizontal direction by the half mirror 124, and an image is formed on the imaging element 121 via the diaphragm plate 123 and the image forming lens 122.

As the imaging elements 111 and 121, an image sensor such as a CCD (Charge Coupled Device) or a CMOS (Complementary Metal Oxide Semiconductor) is used. As the light receiving lens 114, a telecentric lens is used which has a property of not changing a size of an image even when its position in the vertical direction, namely, the photographing axis direction, changes.

The coaxial epi-illumination unit 130 is an epi-illumination device that irradiates the workpiece on the movable stage 12 with illumination light from above, and matches an optical axis of the illumination light with the photographing axis. This coaxial epi-illumination unit 130 is configured by a light source 131 that is arranged facing toward the horizontal direction, and a half mirror 132 that bends illumination light, emitted from the light source 131, downward.

The image forming lens 112, 122, the diaphragm plates 113, 123, the half mirrors 124, 132, and the light receiving lens 114 are arranged in the lens-barrel part 102.

The transmittance illumination unit 150 is a transmittance illumination device that irradiates the workpiece on the movable stage 12 with illumination light from below, and is configured by a light source 151, a mirror 152, and a condensing lens 153. The light source 151 is arranged facing toward the horizontal direction. Illumination light emitted from the light source 151 is reflected by the mirror 152 and emitted via the condensing lens 153. This illumination light is transmitted through the movable stage 12, and one part of the transmitted light is shielded by the workpiece and another part thereof is incident on the light receiving lens 114.

The ring illumination unit 140 is an epi-illumination device that irradiates the workpiece on the movable stage 12 with illumination light from above or from the side, and is formed in a ring shape surrounding the photographing axes of the cameras 110 and 120. This ring illumination unit 140 is an illumination device formed by coaxially arranging a diffused illumination device 141 which irradiates the workpiece on the movable stage 12 with diffused light, and a side-emitting illumination device 142 which irradiates the workpiece on the movable stage 12 with illumination light from the side.

The diffused illumination device 141 has a ring-shaped light source surrounding the photographing axes of the cameras 110 and 120. This light source can be lit in units of two or more blocks, which are obtained by dividing in the circumferential direction. The side-emitting illumination device 142 performs irradiation with illumination light as parallel light or with illumination light having a spread angle close to the parallel light, and can illuminate a periphery of the workpiece from the side.

As each of the light sources of the illumination units 130 to 150, an LED (Light-Emitting Diode) or a halogen lamp is used. The illumination position adjusting part 103 is a relative position adjusting unit that moves the ring illumination unit 140 in the photographing axis direction to adjust a relative position of the ring illumination unit 140 to the movable stage 12. As the workpiece illuminating method, any one of transmittance illumination, ring illumination, and coaxial epi-illumination can be selected.

<Control Unit 20>

Figure 3:
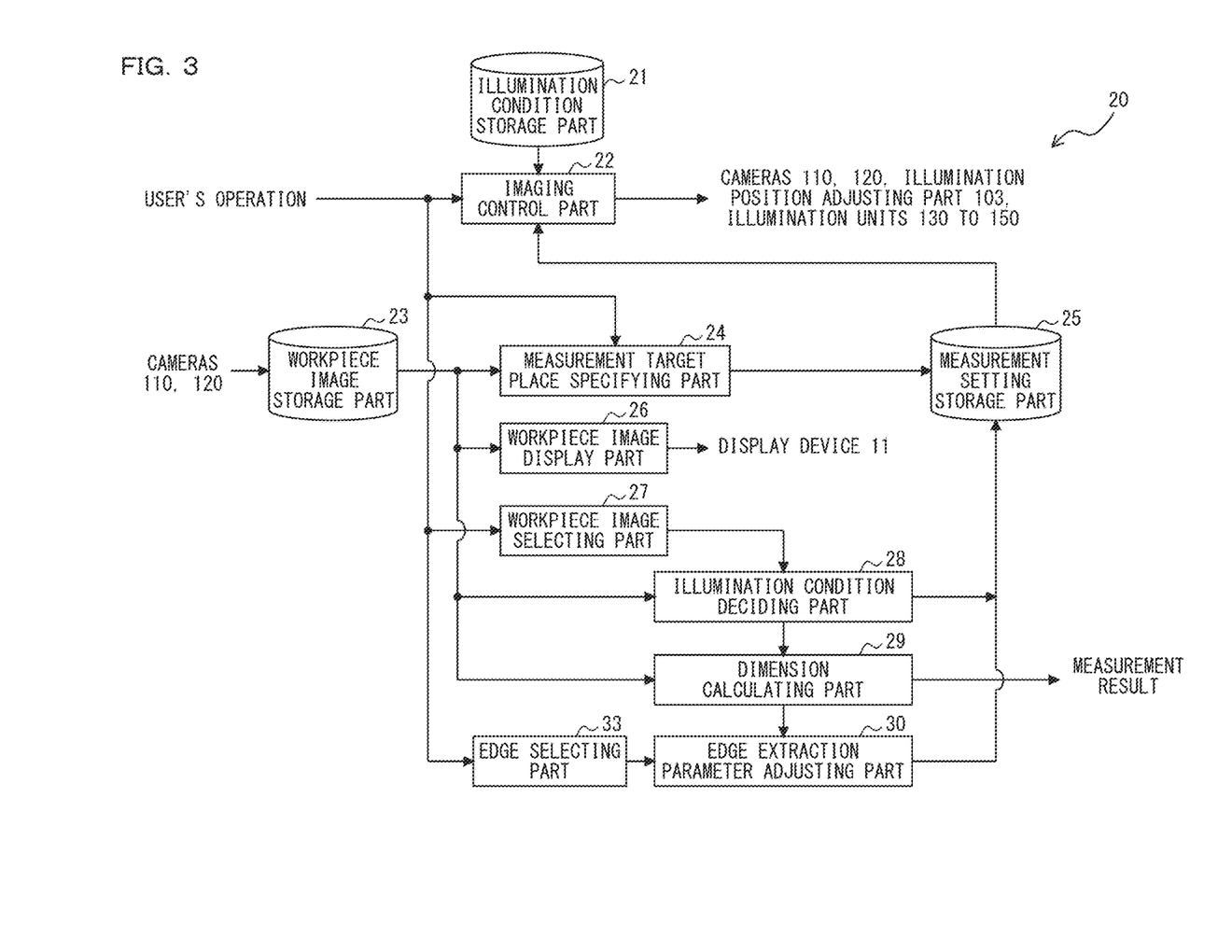
FIG. 3 is a block diagram showing one example of a function configuration in a control unit 20 of FIG. 1.

FIG. 3 is a block diagram showing one example of a function configuration in the control unit 20 of FIG. 1. This control unit 20 is configured by an illumination condition storage part 21, an imaging control part 22, a workpiece image storage part 23, a measurement target place specifying part 24, a measurement setting storage part 25, a workpiece image display part 26, a workpiece image selecting part 27, an illumination condition deciding part 28, a dimension calculating part 29, an edge extraction parameter adjusting part 30, and an edge selecting part 33.

Two or more previously registered illumination conditions are held in the illumination condition storage part 21. Here, it is assumed that the two or more illumination conditions are fixed values. The illumination conditions include a type of illumination, an illumination position, a lighting position, irradiation intensity, and a combination thereof. The type of illumination is a type of illumination device, and is specified out of four types, i.e., coaxial epi-illumination, diffused illumination, side-emitting illumination, and transmittance illumination. The illumination position is a relative position of the ring illumination unit 140 to the movable stage 12, and is specified within a predetermined range. By adjusting the illumination position, the irradiation angle of the illumination light can be changed. The lighting position is a position of a block to be lit in the diffused illumination device 141, and is specified out of two or more lighting patterns. The irradiation intensity is intensity of emitted light of the illumination device, and is specified within a predetermined range.

The imaging control part 22 controls the cameras 110, 120, the illumination position adjusting part 103, and the illumination units 130 to 150 based on the user's operation, to acquire a workpiece image from the camera 110 or 120, and stores the acquired workpiece image into the workpiece image storage part 23.

The measurement target place specifying part 24 specifies a measurement target place on the workpiece image based on the user's operation. For example, the measurement target place specifying part 24 specifies, as the measurement target place, a region on a workpiece image photographed by irradiation with the diffused light of the diffused illumination device 141. By use of the workpiece image photographed by irradiation with the diffused light, it is possible to specify the measurement target place while checking the whole image of the workpiece. Position information indicating the measurement target place and a measurement type are held as measurement setting information in the measurement setting storage part 25.

As a specific method to specify a measurement target place, there are a method of moving a mouse cursor to the vicinity of an edge of an extraction target and performing click operation, and a method of tracing the vicinity of the edge of the extraction target in the case where the display device 11 has a touch panel function to detect a touch operation on the display screen 11a. Further, there are a method of specifying a start point and an end point of the edge of the extraction target, and a method of covering the range of the edge extraction with a rectangle or a circle. It is possible to arbitrarily select these methods. Further, a geometric figure of the edge extraction target can be selected from a straight line, a circle, an arc, and an arbitrary curve.

The imaging control part 22 acquires two or more workpiece images sequentially photographed while making the illumination condition different with respect to a plurality of illumination conditions previously registered in the illumination condition storage part 21. The above two or more workpiece images are workpiece images obtained by photographing the same workpiece. The workpiece image display part 26 displays, on the display device 11, a plurality of workpiece images acquired by the imaging control part 22 for deciding the illumination condition. The workpiece image selecting part 27 selects any one of the workpiece images displayed by the workpiece image display part 26 for deciding the illumination condition. The illumination condition deciding part 28 decides an illumination condition based on the workpiece image selected by the workpiece image selecting part 27.

The illumination condition decided by the illumination condition deciding part 28 is held as measurement setting information in the measurement setting storage part 25 in association with the measurement target place. The imaging control part 22 acquires a workpiece image photographed on the illumination condition decided by the illumination condition deciding part 28. Based on the workpiece image photographed on the illumination condition decided by the illumination condition deciding part 28, the dimension calculating part 29 extracts an edge of the measurement target place, obtains a dimension of the measurement target place based on the extracted edge, and outputs the measurement result.

In the measurement setting storage part 25, two or more measurement target places specified by the measurement target place specifying part 24 on the same workpiece image and an illumination condition decided by the illumination condition deciding part 28 with respect to each of these measurement target places are held as measurement setting information.

The imaging control part 22 repeatedly acquires a workpiece image photographed on the illumination condition held as the measurement setting information while changing the measurement target place, in successive measurement where the measurement setting information has been specified. Further, the dimension calculating part 29 performs edge extraction with respect to each measurement target place held as the measurement setting information, on a plurality of workpiece images acquired in the successive measurement.

In the successive measurement where the measurement setting information has been specified, the workpiece is photographed on an illumination condition suitable for measuring the measurement target place, and edge extraction is performed on the obtained workpiece image. Accordingly, even when a shape or a material of the workpiece changes, stable dimension measurement can be performed only by specifying the measurement setting information.

The dimension calculating part 29 obtains a dimension between edges respectively extracted from two or more workpiece images with mutually different illumination conditions and positions of the measurement target place. With such a configuration, a dimension between edges is obtained by using two or more workpiece images respectively photographed on an illumination condition suitable for measuring the measurement target place. Thus, it is possible to accurately identify a dimension between edges.

A measurement result such as a dimension value is displayed on the display device 11. Further, the control unit 20 creates measurement setting data for successive measurement where the workpiece is successively measured. This measurement setting data includes positioning information, measurement setting information, and information indicating a design value and a tolerance for each measurement target place. The positioning information is information for analyzing a workpiece image to detect a position and a posture of the workpiece.

The dimension calculating part 29 extracts an edge of the measurement target place with respect to each of a plurality of workpiece images acquired by the imaging control part 22 for deciding the illumination condition, and obtains a dimension of the measurement target place based on the extracted edge. As an edge extraction method at the time of deciding the illumination condition, there are a method of obtaining one probable edge by use of a previously specified edge extraction parameter, and a method of calculating two or more edges as candidates.

In the case of calculating two or more edges as candidates, edge points are extracted from an image region specified by the user as a measurement target place or an enlarged area obtained by enlarging the image region only by several pixels, and a large number of extracted edge points are grouped into two or more groups. Then, as a method to group edge points, there are a method of classifying mutually adjacent edge points into the same group by use of position information of edge points, and a method of grouping edge points based on edge characteristics, namely, a direction or intensity of the edge. Further, it is also possible to group edge points by the matching degree with a geometric figure specified as the edge extraction target.

The workpiece image display part 26 displays the extracted edge of the measurement target place and the obtained dimension thereof on the corresponding workpiece image, while listing and displaying a plurality of workpiece images acquired by the imaging control part 22 for deciding the illumination condition. In listing and displaying the workpiece images, for example, the display screen 11a is divided into two or more display regions, and a plurality of workpiece images photographed on mutually different illumination conditions are displayed in the respective display regions. Further, a thumbnail image obtained by reducing the workpiece image is created, and two or more thumbnail images are displayed in the respective display regions. When any thumbnail image is selected, an original workpiece image corresponding to the thumbnail image is displayed.

The workpiece image selecting part 27 selects a workpiece image specified by the user out of the listed and displayed workpiece images. The listed and displayed workpiece images are compared, and by means of the edge or the dimension displayed on the workpiece image, it is possible to arbitrarily select a workpiece image on an illumination condition suitable for measuring the measurement target place. Further, only by selecting the displayed workpiece image, an illumination condition such as a type of an illumination device and an illumination position can be automatically adjusted in accordance with the measurement target place.

Based on a change in luminance in the measurement target place, the workpiece image selecting part 27 selects any one of the displayed workpiece images displayed for deciding an illumination condition. For example, a contrast in the vicinity of an edge of the measurement target place is obtained, and based on the obtained contrast, a workpiece image optimal for the edge extraction is selected. With such a configuration, it is possible to automatically select a workpiece image suitable for measuring the measurement target place out of two or more workpiece images sequentially photographed while making the illumination condition different, so as to decide an illumination condition.

When two or more edges are extracted from the workpiece image photographed on the same illumination condition, the workpiece image display part 26 displays these edges on the corresponding workpiece image. With such a-configuration, by means of the plurality of edges displayed on the workpiece image, it is possible to select a workpiece image on an illumination condition suitable for measuring the measurement target place, and an appropriate edge. The edge selecting part 33 selects any one of the plurality of edges displayed on the workpiece image based on the user's operation.

The edge extraction parameter adjusting part 30 adjusts an edge extraction parameter for edge extraction based on an edge specified by the user out of the plurality of edges extracted from the workpiece image photographed on the same illumination condition. The edge extraction parameters include parameters indicating edge intensity, a scanning direction, an edge direction, and priority specification.

The edge intensity is a differential value of luminance in a luminance distribution including positions of pixels in a linear direction and luminance values of the respective pixels, and an upper limit and a lower limit can be specified as edge intensity parameters. The edge intensity is higher at a pixel position where luminance changes more rapidly. At a pixel position with lower edge intensity, a noise component may be erroneously extracted as an edge, but stable edge extraction can be performed by extracting only edge points within a range specified by the edge intensity parameter.

The scanning direction is a search direction at the time of searching an edge. As a scanning direction parameter, it is possible to select either leftward or rightward, or either upward or downward, as seen from the user with respect to the measurement target place, or select non-specification. The edge direction is a change direction at the time of the luminance value being changed, and in the case of scanning the luminance distribution in the scanning direction, it is possible to select, as an edge direction parameter, a change in luminance value from the low luminance side to the high luminance side, or a change in luminance value from the high luminance side to the low luminance side, or select non-specification. Since edge points constituting a specific edge are normally in the same direction, erroneous extraction of an edge in the opposite direction can be suppressed by specifying the edge direction.

The priority specification is specification as to which edge point is to be adopted in a case where two or more edge points, satisfying edge extraction conditions specified by the respective parameters of the edge intensity, the scanning direction, and the edge direction, are detected on the same straight line. For example, in the case of scanning the luminance distribution in the scanning direction, whether to adopt a first detected edge point or adopt an edge point closest to a center or a center line of the measurement target place is specified by means of the priority specification parameter. Further, scanning the luminance distribution from the side with fewer noise components and adopting a first detected edge point can be specified by means of the priority specification parameter. With such priority specification, it is possible to improve the stability of the edge extraction.

By automatically adjusting the edge extraction parameter to a value suitable for extracting a desired edge from the measurement target place, it is possible to improve the stability of the edge extraction. The edge extraction parameter is adjusted by obtaining a distribution of edge intensity and an edge direction with respect to edge points constituting an edge specified by the user.

<Measurement Setting Screen 40>

Figure 4:
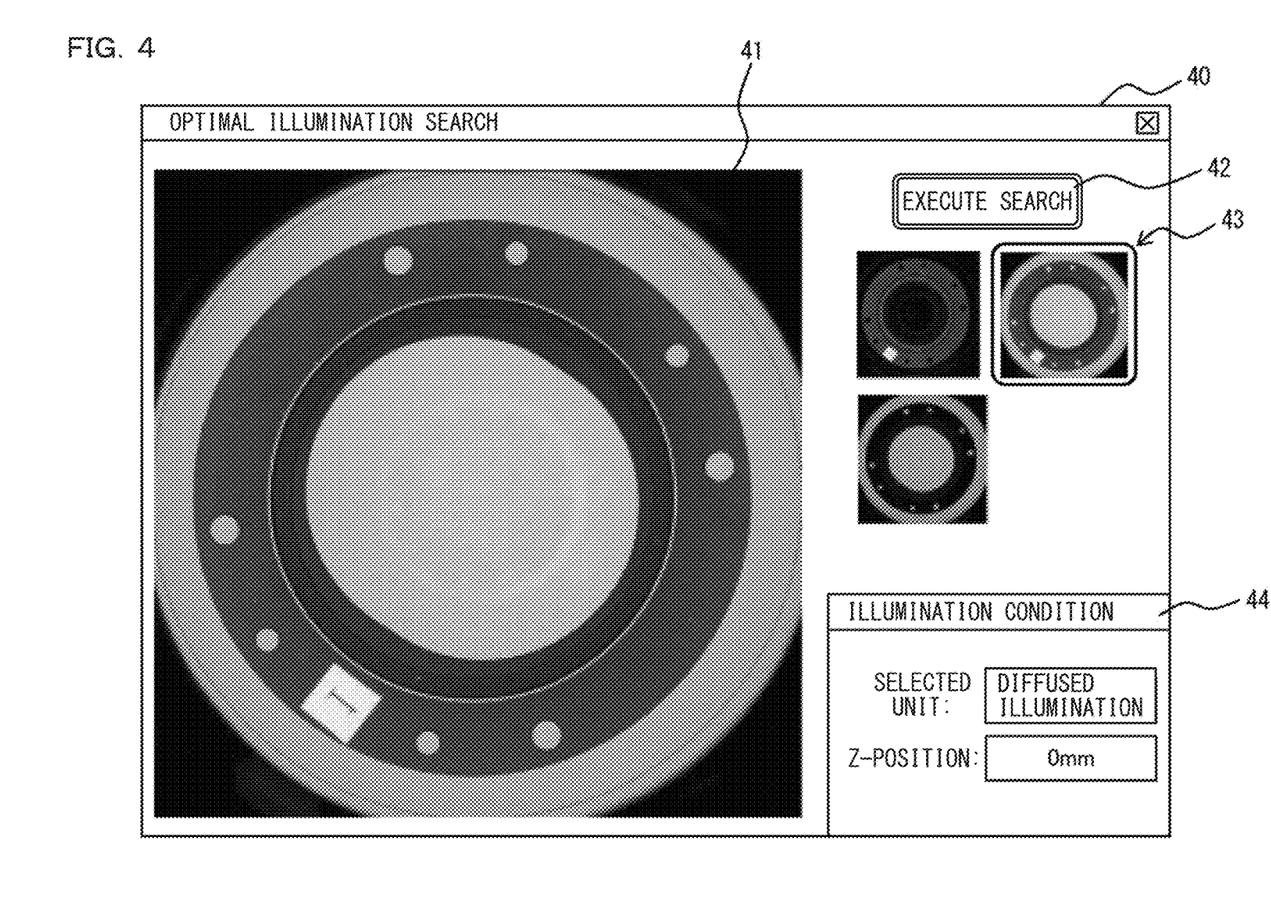
FIG. 4 is a view showing one example of operation of the image measurement device 1 of FIG. 1, and shows a measurement setting screen 40 displayed on a display device 11 of the measurement unit 10.

FIG. 4 is a view showing one example of operation of the image measurement device 1 of FIG. 1, and shows a measurement setting screen 40 displayed on a display device 11 of the measurement unit 10. This measurement setting screen 40 is an edit screen for creating measurement setting data, and is configured by a preview region 41, a search execute button 42, a thumbnail display region 43, and an illumination condition display region 44.

In the preview region 41, a photographed workpiece image 2, which is a workpiece image 2 corresponding to a thumbnail image selected in the thumbnail display region 43, is displayed. The search execute button 42 is an operation icon for executing successive photographing in which the workpiece on the movable stage 12 is sequentially photographed while changing an illumination condition.

In the thumbnail display region 43, a plurality of thumbnail images, created from the workpiece images 2 acquired by the successive photographing, are listed and displayed. The thumbnail image is a reduced image obtained by reducing the workpiece image 2 by pixel thinning processing or the like. In this example, three thumbnail images are displayed in the thumbnail display region 43, and an edge 3 extracted from the measurement target place is displayed on the thumbnail image.

Any one of the thumbnail images in the thumbnail display region 43 can be arbitrarily selected, and the workpiece image 2 corresponding to the selected thumbnail image is displayed in the preview region 41. Every time the selected thumbnail image is changed, the workpiece image in the preview region 41 is switched. The selected thumbnail image is added with a colored rectangular frame, so as to be easily identifiable. In the illumination condition display region 44, illumination conditions corresponding to the selected thumbnail image are displayed. For example, the selected illumination unit is the diffused illumination device 141 of the ring illumination unit 140, and the position of the ring illumination unit 140 in the Z-axis direction is an upper limit, namely, 0 mm.

The user can select the workpiece image 2 photographed on an appropriate illumination condition by checking the edges on the thumbnail images listed and displayed in the thumbnail display region 43 and the edge on the workpiece image 2 displayed in the preview region 41.

Figure 5:
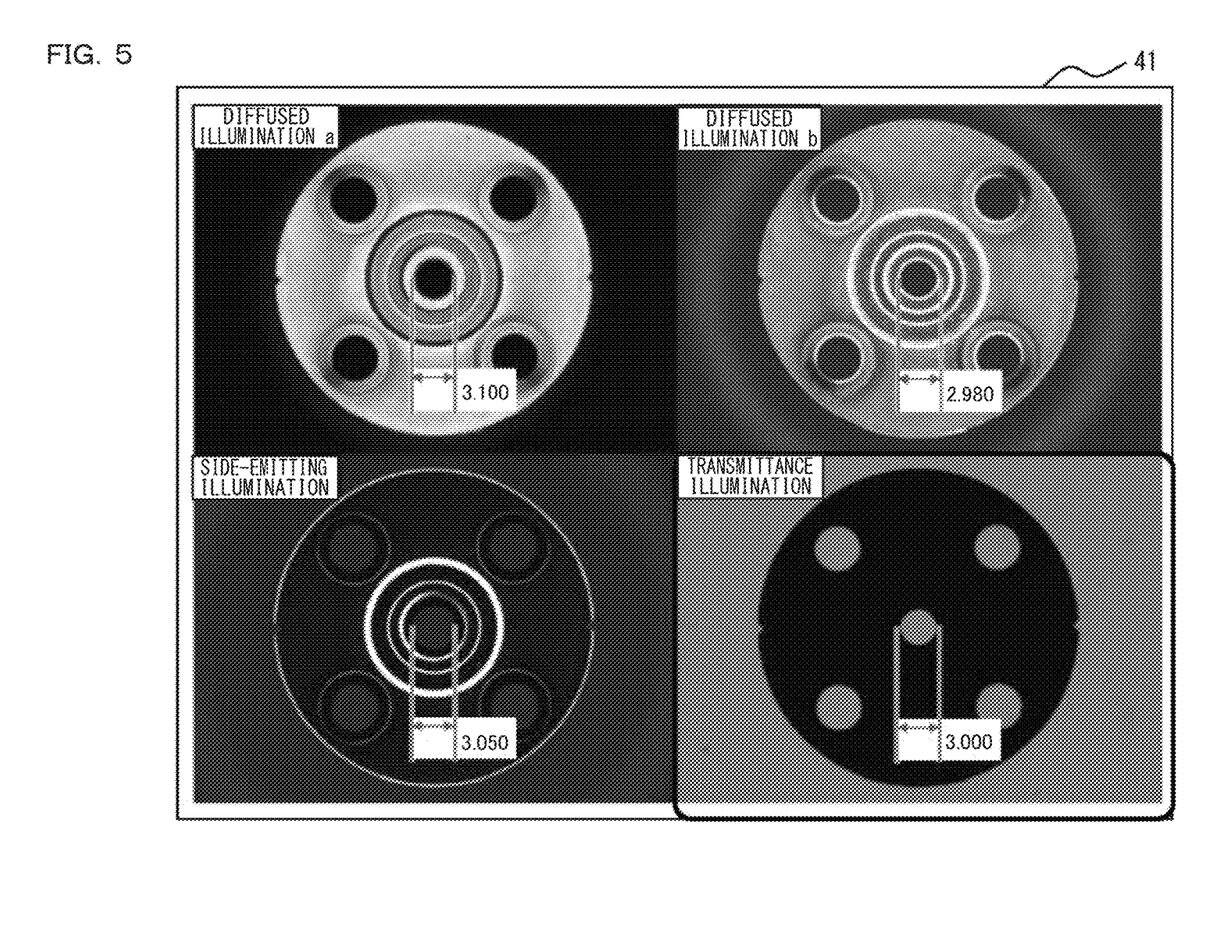
FIG. 5 is a view showing one example of the operation of the image measurement device 1 of FIG. 1, and shows four workpiece images 2 photographed on mutually different illumination conditions.

FIG. 5 is a view showing one example of the operation of the image measurement device 1 of FIG. 1, and shows four workpiece images 2 photographed on mutually different illumination conditions. FIG. 5 shows a case where four workpiece images 2 photographed on different illumination conditions are listed and displayed in the preview region 41 of the measurement setting screen 40. Further, in FIG. 5, a through hole formed at the central part of the workpiece is specified as the measurement target place.

In the preview region 41, there are displayed workpiece images 2 each photographed on the illumination condition: "diffused illumination a", "diffused illumination b", "side-emitting illumination", or "transmittance illumination". In the illumination condition "diffused illumination a", the diffused illumination device 141 of the ring illumination unit 140 is used as the illumination device, and in the case of performing irradiation with illumination light from above, the workpiece image 2 is created by receiving reflected light from the workpiece. In the illumination condition "diffused illumination b", by moving the diffused illumination device 141 in the Z-axis direction, irradiation is performed with illumination light obliquely from above, e.g., obliquely 45°.

In the illumination condition "side-emitting illumination", the side-emitting illumination device 142 of the ring illumination unit 140 is used as the illumination device, and in the case of performing irradiation with illumination light from the side, the workpiece image 2 is created by receiving reflected light from the workpiece. In the illumination condition "transmittance illumination", the transmittance illumination unit 150 is used as the illumination device, and in the case of performing irradiation with illumination light from below, the workpiece image 2 is created by receiving transmitted light transmitted through the workpiece.

A dimension value of the measurement target place is displayed in each workpiece image 2. By checking the dimension values displayed on the workpiece images 2, the user can easily identify the workpiece image 2 photographed on an optimal illumination condition. In this example, it is found that the transmittance illumination is the optimal illumination condition since the design value of the measurement target place is 3.000 and the dimension value "3.000" is displayed on the workpiece image 2 photographed by the transmittance illumination.

Figure 6:
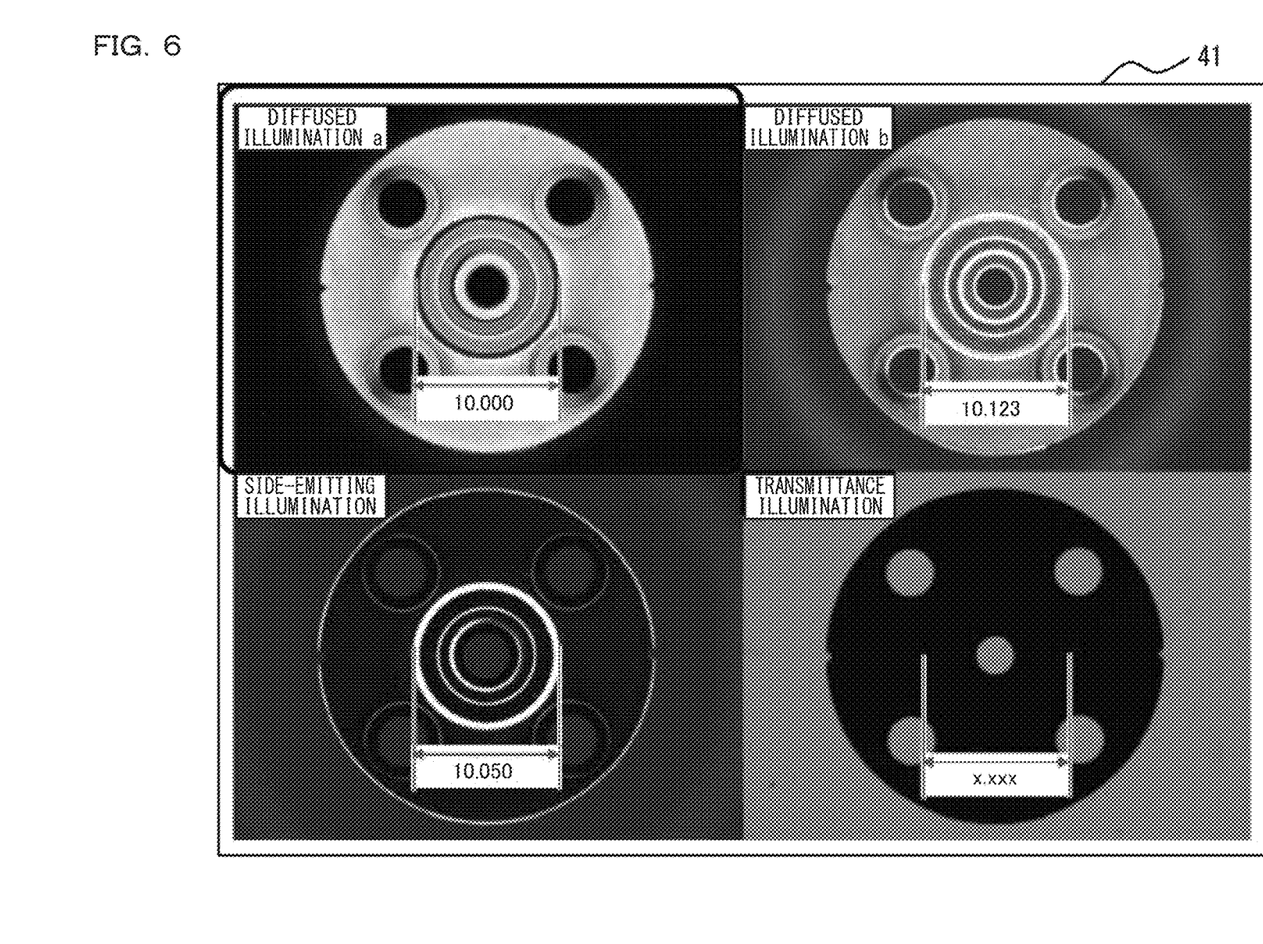
FIG. 6 is a view showing one example of the operation of the image measurement device 1 of FIG. 1, and shows four workpiece images 2 photographed on mutually different illumination conditions.

FIG. 6 is a view showing one example of the operation of the image measurement device 1 of FIG. 1, and shows four workpiece images 2 photographed on mutually different illumination conditions. In FIG. 6, a circular step formed on the workpiece surface is specified as the measurement target place. In this example, it is found that the diffused illumination a is the optimal illumination condition since the design value of the measurement target place is 10.000 and the dimension value "10.000" is displayed on the workpiece image 2 photographed by the diffused illumination a.

<Edge Extraction Setting Screen 50>

Figure 7:
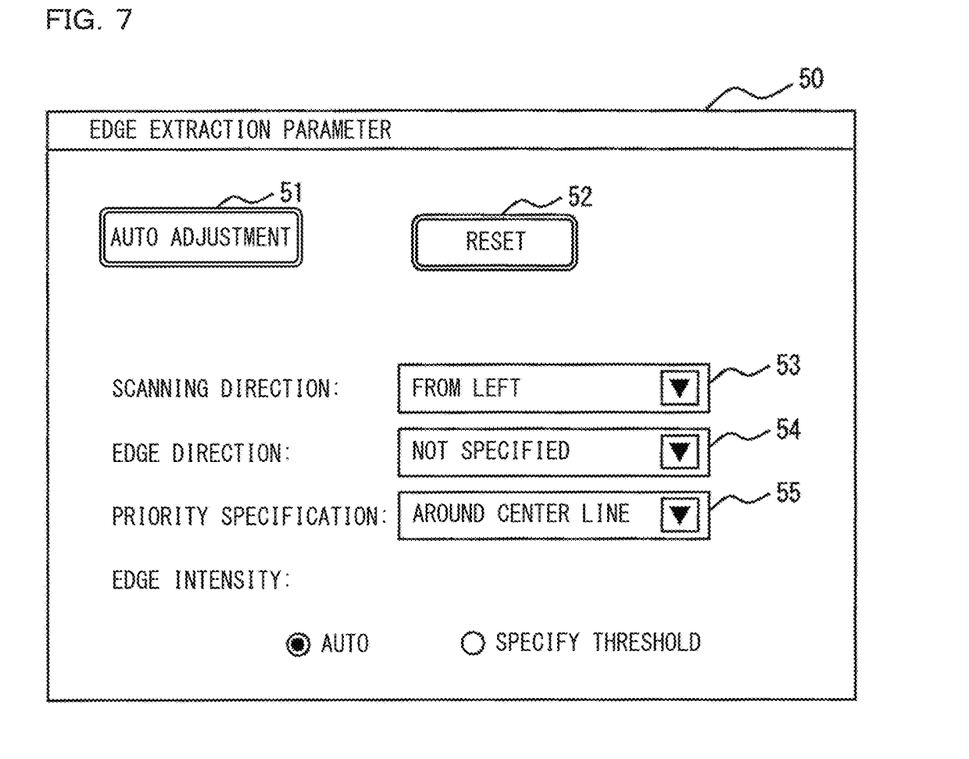
FIG. 7 is a view showing one example of the operation of the image measurement device 1 of FIG. 1, and shows an edge extraction setting screen 50 displayed on the display device 11.

FIG. 7 is a view showing one example of the operation of the image measurement device 1 of FIG. 1, and shows an edge extraction setting screen 50 displayed on the display device 11. This edge extraction setting screen 50 is an operation screen for specifying or automatically adjusting the edge extraction parameters, and is configured by an automatic adjustment button 51, a reset button 52, a scanning direction input field 53, an edge direction input field 54, and a priority specification input field 55.

The automatic adjustment button 51 is an operation icon for executing automatic adjustment of the edge extraction parameters. The reset button 52 resets the current edge extraction parameters and returns the edge extraction parameters to previously set initial values or default values. The scanning direction input field 53 is an input field for specifying the scanning direction parameter. The edge direction input field 54 is an input field for specifying the edge direction parameter. The priority specification input field 55 is an input field for specifying the priority specification parameter.

As the edge intensity parameter, it is possible to select either automatic specification or threshold specification where an upper limit and a lower limit are individually specified. In the automatic specification for the edge intensity parameter, an upper limit and a lower limit suitable for extracting an edge of the measurement target place are automatically specified. In the threshold specification for the edge intensity parameter, the user can arbitrarily specify an upper limit or a lower limit within a predetermined range.

Figure 8:
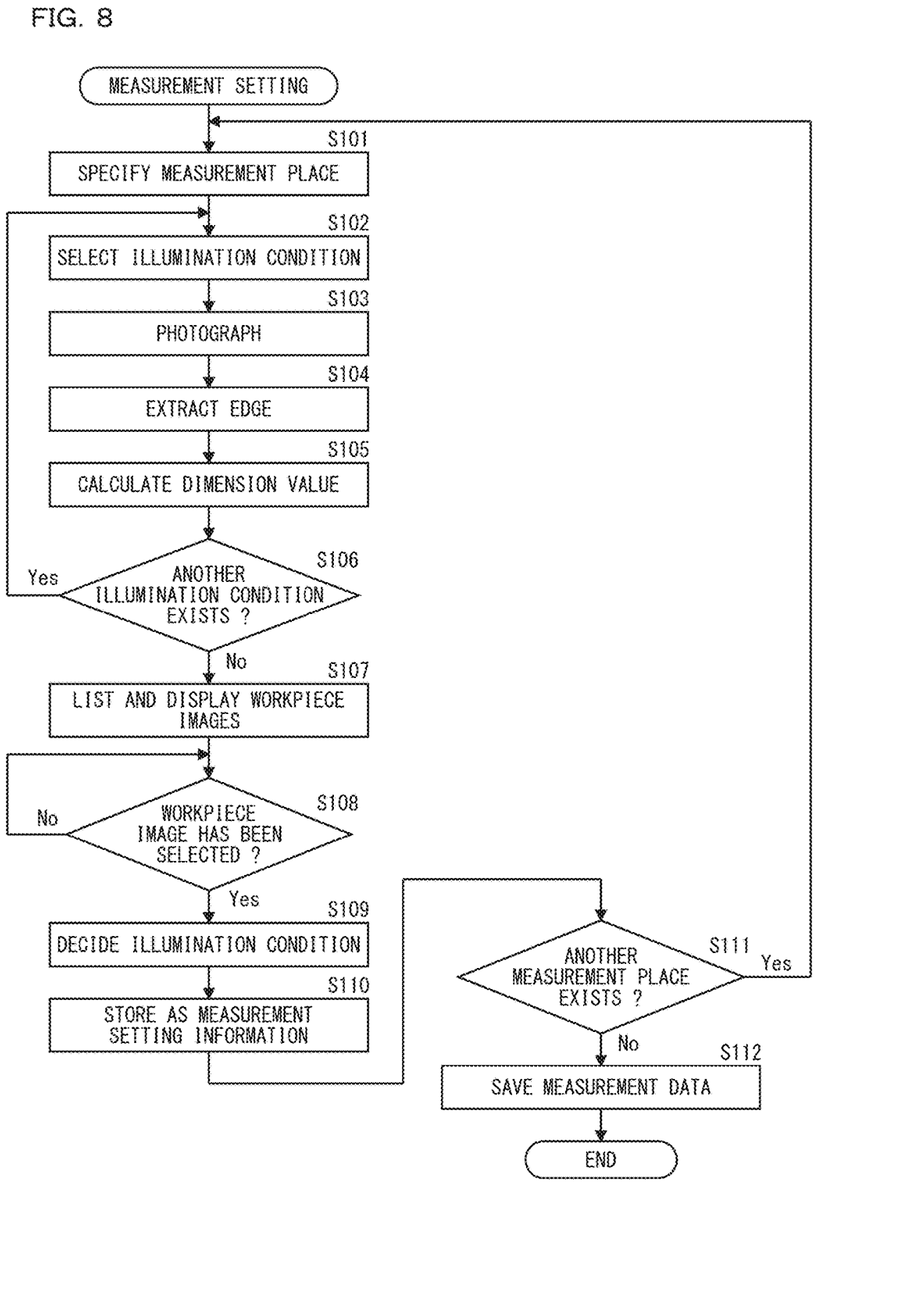
FIG. 8 is a flowchart showing one example of operation at the time of measurement setting in the image measurement device 1 of FIG. 1.

Steps S101 to S112 of FIG. 8 are a flowchart showing one example of operation at the time of measurement setting in the image measurement device 1 of FIG. 1. First, the control unit 20 accepts the user's operation, and when a measurement target place is specified on a workpiece image (Step S101), the control unit 20 selects an illumination condition and photographs the workpiece on the movable stage 12, to acquire a workpiece image (Steps S102, S103). Next, the control unit 20 extracts an edge of the measurement target place based on the acquired workpiece image, and calculates a dimension value of the measurement target place based on the extracted edge (Steps S104, S105).

The control unit 20 repeats the processing procedure from Step S102 to Step S105 while changing the illumination condition (Step S106). When the workpiece images are acquired with respect to all previously registered illumination conditions, the control unit 20 lists and displays the acquired workpiece images on the display device 11 (Step S107).

Next, the control unit 20 accepts the user's operation, and when any one of the workpiece images being listed and displayed is selected (Step S108), the control unit 20 decides an illumination condition based on the selected workpiece image, and stores the illumination condition as measurement setting information (Steps S109, S110).

When there is another measurement target place, the control unit 20 repeats the processing procedure from Step S101 to Step S110 (Step S111). When the illumination conditions are decided with respect to all the measurement target places, the control unit 20 creates measurement setting data and completes this processing (Step S112).

Figure 9:
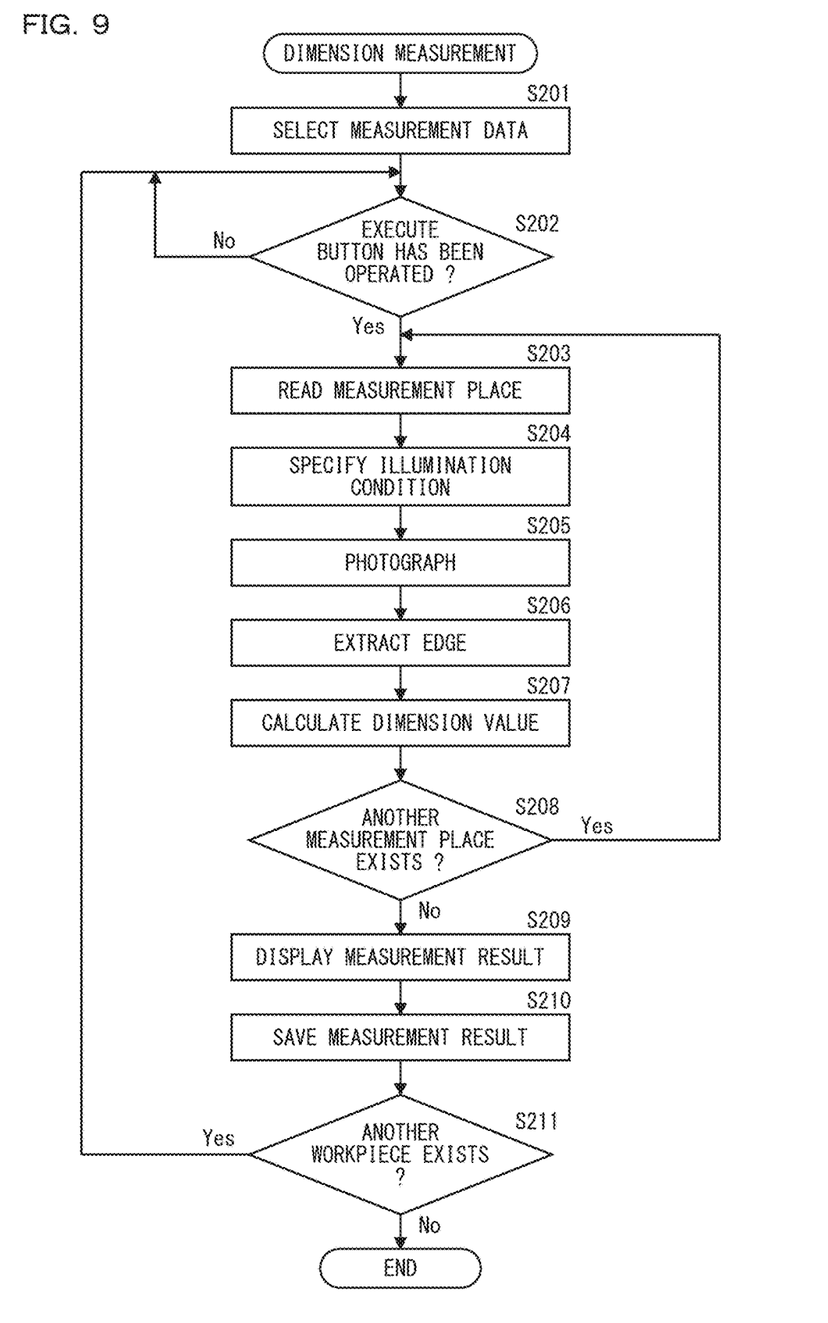
FIG. 9 is a flowchart showing one example of operation at the time of dimension measurement in the image measurement device 1 of FIG. 1.

Steps S201 to S211 of FIG. 9 are a flowchart showing one example of operation at the time of dimension measurement in the image measurement device 1 of FIG. 1. First, the control unit 20 accepts the user's operation, and selects measurement setting data in accordance with the workpiece as the successive measurement target (Step S201).

Next, when the execute button 16 of the measurement unit 10 is operated (Step S202), the control unit 20 reads the measurement target place held as the measurement setting data (Step S203), specifies an illumination condition, and photographs the workpiece on the movable stage 12, to acquire a workpiece image (Steps S204, S205).

The control unit 20 extracts an edge of the measurement target place based on the acquired workpiece image (Step S206), and calculates a dimension value of the measurement target place based on the extracted edge (Step S207). When there is another measurement target place, the control unit 20 repeats the processing procedure from Step S203 to Step S207 (Step S208). When the dimension measurement is completed with respect to all measurement target places, the control unit 20 displays the edge and the dimension value as measurement results on the display device 11 (Step S209), and saves the measurement results (Step S210).

When there is another workpiece as a successive measurement target, the control unit 20 repeats the processing procedure of Step S202 and subsequent steps, and when there is no other workpiece as the successive measurement target, the control unit 20 completes this processing (Step S211).

According to the present embodiment, since an illumination condition is decided by selecting any one of the listed and displayed workpiece images 2, it is possible for even a non-skilled person to fully exert performance of the device. Especially, only by selecting the displayed workpiece image 2, an illumination condition such as a type of an illumination device or an irradiation position with illumination light can be automatically adjusted in accordance with a measurement target place. Further, since the illumination condition is automatically adjusted in accordance with the measurement target place, it is possible to suppress erroneous extraction of a texture on the workpiece surface as an edge in dimension measurement using the epi-illumination.

In the present embodiment, the description has been given to the example of the case where two or more previously registered illumination conditions are fixed values, but the present invention may include an illumination condition specifying unit that specifies two or more previously registered illumination conditions based on the user's operation.

Further, in the present embodiment, the description has been given to the example of the case where the illumination position adjusting part 103 adjusts the position of the ring illumination unit 140 in the Z-axis direction, to thereby adjust the relative position of the ring illumination unit 140 to the movable stage 12. However, the present invention does not limit the configuration of the relative position adjusting unit thereto. For example, the relative position adjusting unit may be configured such that the movable stage 12 is moved in the Z-axis direction, or the movable stage 12 and the ring illumination unit 140 are separately moved in the Z-axis direction, to thereby adjust the relative position of the ring illumination unit 140 to the movable stage 12.

What is claimed is:

1. An image measurement device comprising:
 a stage for placing a workpiece;
 an illumination device that illuminates the workpiece on the stage;
 a camera that photographs the workpiece on the stage to generate a workpiece image;
 a measurement target place specifying unit that specifies a measurement target place on the workpiece image;
 an illumination condition storage unit that holds two or more illumination conditions;
 an imaging control unit that controls the camera and the illumination device to acquire two or more of the workpiece images sequentially photographed while making the illumination condition different;
 a workpiece image display unit that displays the acquired plurality of workpiece images;
 a workpiece image selecting unit that selects any one of the displayed workpiece images;
 an illumination condition deciding unit that decides the illumination condition based on the selected workpiece image;
 a measurement setting storage unit that holds, as measurement setting information, two or more measurement target places specified on the same workpiece image by the measurement target place specifying unit and an illumination condition decided by the illumination condition deciding unit with respect to each of these measurement target places, wherein the illumination condition is held in association with the measurement target place in the measurement setting storage unit; and
 a dimension calculating unit that extracts an edge of the measurement target place based on the workpiece image photographed on the decided illumination condition, and obtains a dimension of the measurement target place based on the extracted edge;
 wherein the imaging control unit repeatedly acquires a workpiece image photographed on the illumination condition in association with each of the measurement target places held as the measurement setting information, and
 the dimension calculating unit performs edge extraction with respect to each of the measurement target places held as the measurement setting information on the plurality of workpiece images acquired by the imaging control unit and obtains a dimension between edges respectively extracted from two or more workpiece images with mutually different illumination conditions and positions of the measurement target place.

2. The image measurement device according to claim 1, comprising, as the illumination devices,
 a diffused illumination device that irradiates the workpiece on the stage with diffused light from above; and a transmittance illumination device that irradiates the workpiece on the stage with illumination light from below, wherein the illumination conditions include a tune of the illumination device.

3. The image measurement device according to claim 2, further comprising, as the illumination device, a side-emitting illumination device that irradiates the workpiece on the stage from a side with illumination light as parallel light or with illumination light having a spread angle close to the parallel light.

4. The image measurement device according to claim 2, wherein the measurement target place specifying unit specifies, as the measurement target place, a region on the workpiece image photographed by irradiation with the diffused light of the diffused illumination device.

5. The image measurement device according to claim 1, comprising as the illumination device a ring illumination device having a ring-shaped light source that surrounds a photographing axis of the camera, the light source being lit in units of two or more blocks, which are obtained by dividing in a circumferential direction, wherein the illumination conditions include a lighting position of the ring illumination device.

6. The image measurement device according to claim 1, comprising a relative position adjusting unit that moves the stage or the illumination device in the photographing axis direction of the camera, to adjust a relative position of the illumination device to the stage, wherein the illumination conditions include the relative position.

7. The image measurement device according to claim 1, comprising an illumination condition specifying unit that specifies the illumination condition based on the user's operation.

8. The image measurement device according to claim 1, wherein the workpiece image selecting unit selects any one of the displayed workpiece images based on a change in luminance in the measurement target place.

9. The image measurement device according to claim 1, wherein the dimension calculating unit extracts an edge of the measurement target place with respect to the acquired plurality of workpiece images, the workpiece image display unit displays the extracted edge on the corresponding workpiece image while listing and displaying the acquired plurality of workpiece images, and the workpiece image selecting unit selects a workpiece image specified by the user out of the listed and displayed workpiece images.

10. The image measurement device according to claim 9, wherein the dimension calculating unit obtains a dimension of the measurement target place based on the edge extracted from the measurement target place with respect to the acquired plurality of workpiece images, and the workpiece image display unit displays the obtained dimension on the corresponding workpiece image.

11. The image measurement device according to claim 9, wherein when two or more edges are extracted from the workpiece image photographed on the same illumination condition, the workpiece image display unit displays these edges on the corresponding workpiece image, and the image measurement device further includes an edge selecting unit which selects any one of the plurality of edges displayed on the workpiece image based on the user's operation.

12. The image measurement device according to claim 11, comprising an edge extraction parameter adjusting unit that adjusts an edge extraction parameter for edge extraction based on an edge specified by the user out of the plurality of edges extracted from the workpiece image photographed on the same illumination condition.

* * * * *